Figure 3:
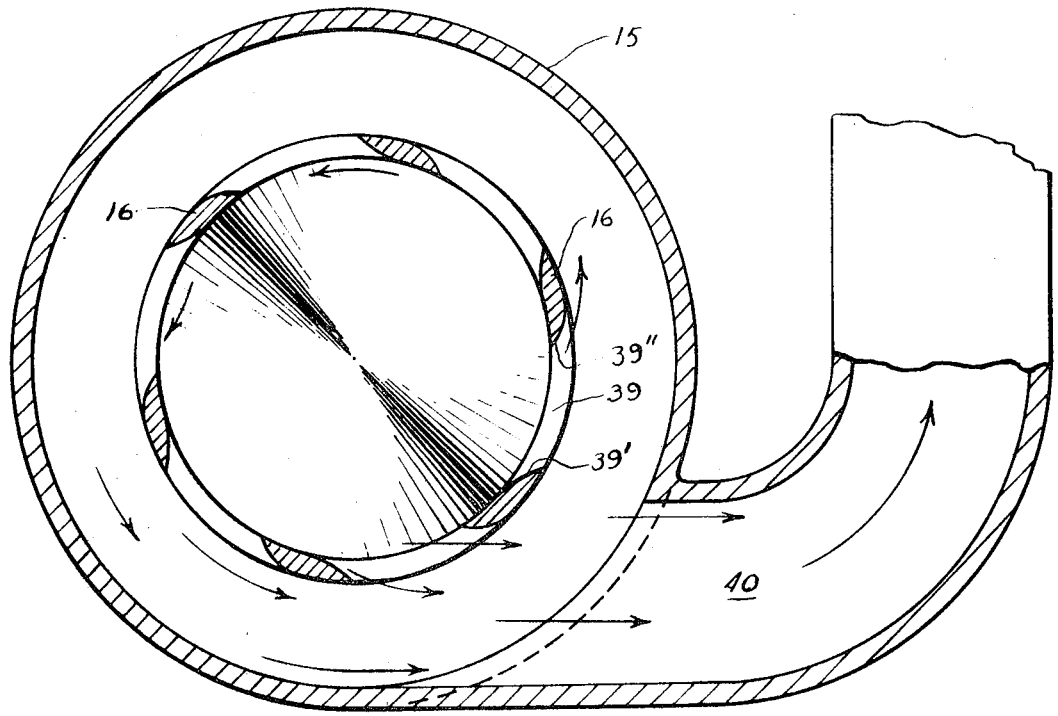

United States Patent [19]
Melchlor

[11] 3,736,911
[45] June 5, 1973

[54] INTERNAL COMBUSTION ENGINE

[76] Inventor: Frederick C. Melchlor, 258 Riverside Drive, New York, N.Y. 10022

[22] Filed: June 28, 1971

[21] Appl. No.: 157,172

[52] U.S. Cl. ....... 123/65 VA, 123/65 WA, 123/30 C, 123/190 C
[51] Int. Cl. ........ F02b 75/02, F02d 39/04, F01l 7/00
[58] Field of Search ..................... 123/65 WA, 65 JA, 123/30 C, 190 C

[56] References Cited

UNITED STATES PATENTS

| | | | |
|---|---|---|---|
| 1,899,217 | 2/1933 | Taylor et al. | 123/65 WA |
| 2,290,212 | 7/1942 | Schweitzer | 123/65 WA |
| 1,944,352 | 1/1934 | Lang | 123/65 WA |
| 1,664,056 | 3/1928 | Astrom | 123/190 C |

FOREIGN PATENTS OR APPLICATIONS 530,410  7/1956  Canada........................... 123/65 WA Primary Examiner—Martin P. Schwadron
Assistant Examiner—A. M. Zupcic
Attorney—Nichol M. Sandoe, Roy C. Hopgood, John M. Calimafde et al.

[57] ABSTRACT

An internal combustion piston type two-cycle, compression ignition engine having its cylinder walls provided with a plurality of substantially tangentially disposed spaced exhaust ports which are opened by the piston near the end of each power stroke, and a plurality of substantially tangentially disposed air intake ports at the end of the compression stroke, said intake ports being surrounded and controlled by a rotating sleeve having slots shaped and spaced to match the said intake ports, said sleeve being rotated at a speed equal to that of the engine crankshaft divided by the number of the intake ports therein.

11 Claims, 3 Drawing Figures

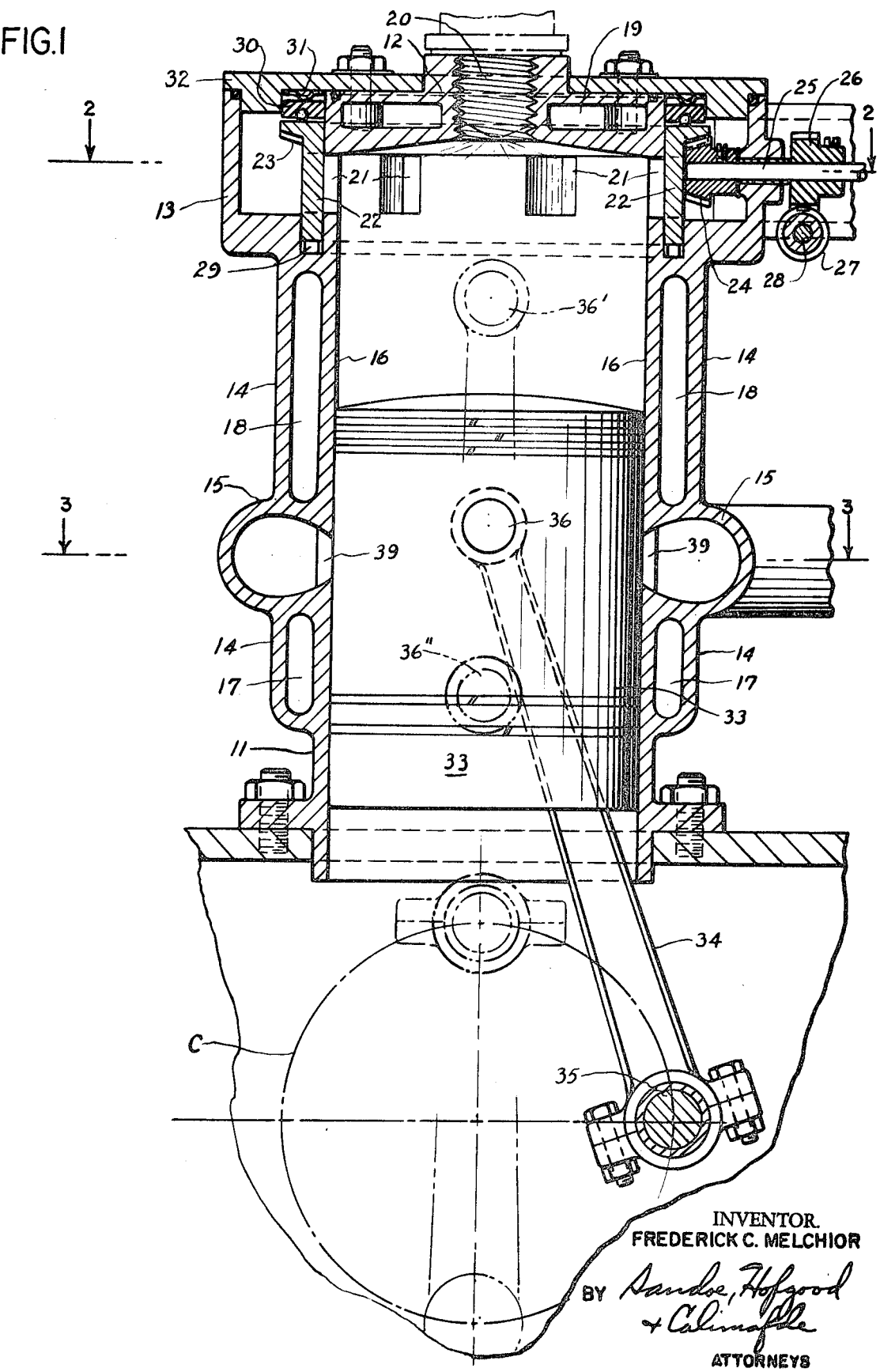

INVENTOR.
FREDERICK C. MELCHIOR

BY

ATTORNEYS

INTERNAL COMBUSTION ENGINE

This invention relates to piston type internal combustion engines. It relates more particularly to the two-cycle, compression ignition variety, in which the fuel is injected directly into the cylinder at or near top dead center of the compression stroke of the piston and is immediately ignited by the heat generated by compression of the air charge. Thereafter, and immediately following the power stroke of the piston, which is the only other stoke of a two-cycle engine, the products of combustion are discharged through outlet ports in the cylinder wall which are uncovered by the piston shortly before the 180° position of the crankshaft.

Two-cycle internal combustion engines have many theoretical and practical advantages over four-cycle engines. For example, since the two-cycle engine has a power stroke for each complete revolution of the crankshaft, as compared with one power stroke for two complete revolutions of the crankshaft in the four cycle engine, it can, in theory, develop twice as much power for a given displacement, all other factors being equal.

In particular, the compression ignition type of two-cycle engine offers many advantages, particularly as to the elimination of electrical ignition and its many complications, and as to thermal efficiency. The latter depends entirely on the overall expansion ratio in which cylinder compression ratio and the back pressure on the exhaust are the major factors. Since compression ignition requires compression ratios in excess of 14:1, compression ignition engines in general are more efficient and hence "cleaner" than other engines.

However, such engines have not always produced the maximum efficiencies of which they are theoretically capable. It is, therefore, an object of the present invention to provide a two-cycle, compression ignition engine adapted to improve thermal efficiencies and, therefore, a "cleaner" engine, i.e., one which will discharge less pollutants into the atmosphere.

In particular, it is an object of the invention to provide an improved valve arrangement to control the intake of air and adapted to improve the scavenging of the combustion chamber, and to provide more efficient mixing of fuel and air as required for complete, clean combustion.

Efficient scavenging, particularly in a two cycle engine, is essential to efficient combustion, but the mere supplying of excess air in an effort to obtain complete combustion has been unsatisfactory because it not only reduces the power of the engine, but also because of the generation and emission of nitrous oxides. It is an object of the present invention to improve the efficiency of combustion by injecting air into the combustion chamber at high rotational velocity to provide highly turbulent stratification for uniform mixing with the atomized fuel, thereby reducing the excess air required for complete combustion and reducing the generation and emission of nitrous oxides.

Other objects and advantages of the invention will appear hereinafter.

Figure 2:
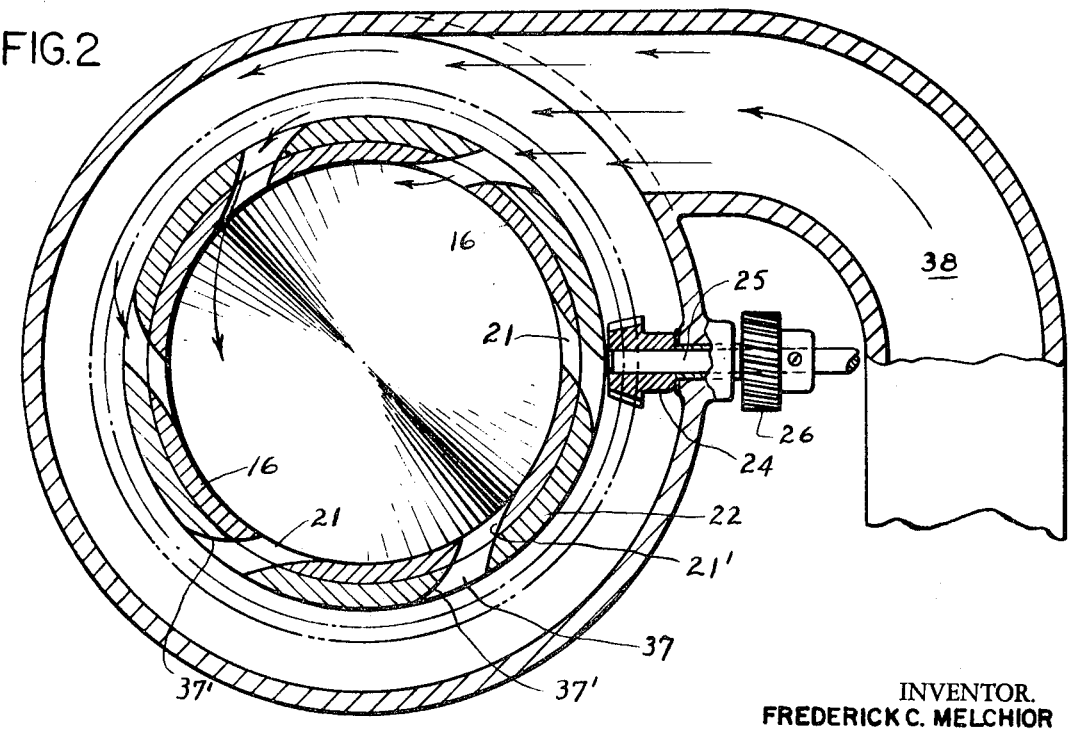

A preferred embodiment of the invention selected for purposes of illustration is shown in the accompanying drawings, in which, FIG. 1 is a vertical section through the cylinder of a one-cylinder engine, the piston being shown at the mid-position of its down, or power stroke, FIG. 2 is a section on the line 2—2 of FIG. 1, at the level of the intake housing, the parts being shown at a later time in the cycle when the inlet ports of the cylinder wall and the rotating valve sleeve are in full conjunction.

FIG. 3 is a section on the line 3—3 of FIG. 1 at the level of the exhaust housing.

Referring to the drawings, FIG. 1 illustrates a one-cylinder, two-cycle engine of which cylinder 11, cylinder head 12, air intake housing 13, cooling jackets 14, and exhaust housing 15 are integral component parts. Between the cooling jackets 14 and the cylinder wall 16 are annular cooling chambers 17 and 18 designed to accommodate a suitable coolant. A cooling chamber 19 is also provided in the cylinder head. Alternatively the latter may be vented to the air intake housing, the choice depending on thermal conditions. The cylinder head 12 is also provided with a threaded aperture 20 extending therethrough and designed to accommodate a fuel injection nozzle (not shown) of a conventional type known in the art. The cylinder wall 16, adjacent to the cylinder head, is provided with a series of circumferentially spaced intake ports 21 surrounded by a rotating sleeve 22 having its upper end provided with a bevel ring gear 23. The said ring gear is engaged by a bevel gear 24 mounted on a shaft 25 extending through the intake housing 13 and driven by helical gears 26 and 27, the latter mounted on the engine-driven shaft 28. Conventional means (not shown) are provided for driving the shaft 28 in timed relation to the rotation of the crankshaft, as for example shafts and gears similar to those used to drive the cam shaft of a conventional engine. The rotating sleeve 22 is spring-loaded against roller or needle bearings 29 by the ball bearings 30, the springs 31, and the cover plate 32 that seals off the intake housing 13.

Within the cylinder 16 a conventional piston 33 is mounted for reciprocation with a conventional connecting rod 34 engaging a likewise conventional crankshaft, the path of the center of its crank pin 35 being indicated by the broken line C.

The pin connection between the connecting rod 34 and piston 33 at the mid-position shown in FIG. 1 is illustrated by broken lines 36. At the uppermost position of the piston the position of the pin is shown at 36' and at the lowermost position of the piston is shown at 36".

Referring to FIG. 2, the cylinder wall 16 with its substantially tangentially disposed, spaced intake ports 21, is shown surrounded by the rotating sleeve 22. Said sleeve is provided with intake slots 37 designed and spaced to match the intake ports 21 and are shown in full conjunction with them in FIG. 2. The intake housing 13 is provided with a tangentially disposed entrance passage 38 adapted to provide uniform and frictionless flow and distribution of the intake air. Preferably intake air is supplied under pressure by a conventional supercharger (not shown).

As shown in FIG. 2, the intake ports 21 of the cylinder are flared outwardly from the outside wall of the cylinder to the inside wall of the cylinder so that the area of the entrance to each of the ports 21 is less than the area of the exits from the ports. Moreover the leading surfaces 21' are preferably curved in such manner that they are substantially tangential to the inside surface of the cylinder wall.

Likewise, the intake slots 37 of the sleeve 22 are flared outwardly from the inside wall of the sleeve to the outside wall of the sleeve so that the area of the entrance to each of the slots is greater than the area of the exits from the slots, but is substantially equal to the area of the entrance to each of the ports 21. Also the trailing surfaces 37' of the slots 37 are preferably curved in such manner that they are substantially tangential to the outer surface of the sleeve.

Thus, when the intake ports 21 and the slots 37 are in full conjunction as shown in FIG. 2 they form Venturi-shaped passages from which air is discharged into the combustion chamber substantially tangentially to the cylinder wall and in a manner which facilitates the rotary flow of air and its distribution within the combustion chamber as an aid to rapid and thorough scavenging of the exhaust gases therefrom through the exhaust ports. As shown, the said passages are oriented for counterclockwise flow to match the direction of flow of air from entrance passage 38.

Such thorough scavenging is, in turn, aided by the arrangement and configuration of the exhaust ports 39 which extend through the cylinder wall 16 as shown in FIG. 3.

Preferably the passages through the ports 39 are also Venturi-shaped as shown in FIG. 3 in similar manner to the Venturi-shaped intake passage of FIG. 2 when the ports 21 and slots 37 are in full conjunction. By the provision of the curved surfaces 39' and 39'' which are substantially tangential to the inner and outer surfaces, respectively, of the cylinder 16, the direction of flow of the exhaust gases from the combustion chamber into the exhaust housing and toward the exhaust passage 40 is substantially tangential to the wall of the cylinder. As shown, the flow of exhaust gases in the exhaust housing is counter-clockwise, thus conforming to the counter-clockwise flow in the intake housing and within the combustion chamber. Preferably the exhaust passage 40 is tangentially disposed to the exhaust housing 15 and is thus adapted to permit uniform, high speed flow of the products of combustion to the exhaust manifold, thus minimizing backpressure and improving the scavenging of the cylinder.

The operation of the engine will now be described with reference to FIG. 1, bearing in mind that references to the directions "up" and "down" apply only to the drawing as it appears on the sheet. It will be understood that engine cylinders may be mounted and operated in any position, including the inverted position. Moreover, unless otherwise indicated, when "degrees" are referred to hereinafter, they refer to degrees of rotation of the crankshaft, the 0°–360° position being the position when the piston is at the top of its upward stroke. In FIG. 1 the crankshaft position is 90° and the piston 33 is shown in approximately mid-position, where it covers and closes the exhaust ports 39. The piston is assumed to be on its way down, i.e., on the power stroke. At approximately 135°, the piston begins to open the exhaust ports 39, allowing the products of combustion developed during the power stroke, and which are already on their way down, to be discharged through the exhaust passage 40. The exhaust ports will be fully open at 180° and will be closed at approximately 225°.

When the piston is in the mid-position shown in FIG. 1 the air intake ports 21 are closed by the sleeve 22, but as the piston continues its downward power stroke, the sleeve is rotated to bring the slots 37 to a position to open the ports 21. The timing is preferably such that the slots 37 begin to open the ports 21 at approximately 150°, i.e., about 15° after the exhaust ports have begun to be opened. The slots will then be in full conjunction with the ports 21 to allow maximum flow of air at approximately 195°, i.e., 15° after the piston has begun its upward stroke. During this period the violent rotation of air within the combustion chamber and its efficient scavenging action will have cleared the combustion chamber of exhaust gases. However, the timing is such that the air intake ports 21 are not fully closed until 240°, i.e., 15° after the exhaust ports 39 have been fully closed. In this manner it is possible to supercharge the cylinder during this 15° period.

Thereafter during its upward stroke, the piston will continue compressing the fresh air charge which, with a compression ratio of 16–18:1, will produce pressures at the top of the compression stroke substantially in excess of 30 atmospheres, resulting in a temperature of 500° C. or better, which is more than adequate to insure positive and uniform compression ignition of the "atmoized" fuel spray injected into the cylinder.

It will be noted that in the embodiment illustrated, six equally spaced intake ports 21 are provided in the cylinder wall and six equally spaced slots 37 are provided in the sleeve 22. Thus, the ports and slots are spaced at 60° so that for each complete 360° revolution of the crankshaft required for each complete operating cycle of the engine, it is only necessary to rotate the sleeve through an angle of 60°. The number of ports 21 and slots 37 may be varied as desired as long as they are equally spaced at angles equal to 360° divided by the number of ports. Thus if eight ports are used, they should be spaced at 45°.

The timing of the valve sleeve 22 with respect to the piston operation may be easily adjusted by adjusting the shaft 28, i.e., by turning it the desired number of degrees against a graduated scale.

Any suitable fuel injection system capable of delivering liquid fuel such as kerosene or fuel oil to the cylinder through the injection nozzle at high pressure may be used. Such systems comprise an injection pump and means to meter the fuel supplied to the cylinder. The nozzles are usually adjustable for operation over a wide range of pressures depending on the viscosity of the fuel used. For fuel oil such as ordinary No. 2 or No. 3 furnace oil, the pressure may range from about 3,000 p.s.i. to as high as 7,000 p.s.i. to produce the atomization required for perfect combustion. The fuel spray may be fan shaped, in which case a plurality of nozzles may be used, or it may have the form of a hollow cone discharged from a single, centrally located nozzle, such as shown in FIG. 1, with an apex angle of about 150°. Injection takes place at or near top dead center position of the piston. In large, slow-turning engines, it is usually timed to occur at top dead center. In smaller, high speed engines, it may be timed to occur a few degrees before top dead center.

It will be understood that the invention may be variously modified and embodied within the scope of the subjoined claims.

I claim as my invention:

1. In a two cycle internal combustion engine comprising the usual piston and crankshaft connected thereto, a cylinder having a plurality of intake ports extending through the wall near the upper end thereof, said ports being spaced at equal intervals around the circumference of the cylinder, a short cylindrical valve sleeve surrounding and in contact with the outside wall of said cylinder and mounted for rotation with respect to said cylinder and covering said intake ports but terminating immediately below said ports, said sleeve having a plurality of intake slots extending through the wall thereof corresponding in number to the inlet ports of the cylinder, said slots being spaced around the circumference of the sleeve at intervals corresponding to the intervals between the cylinder intake ports and positioned to register with the intake ports of the cylinder periodically as said sleeve rotates with respect to said cylinder, said cylinder being provided with a plurality of exhaust ports extending through the wall of the cylinder below said sleeve and positioned to be opened and closed by the piston as it reciprocates within and in contact with the cylinder, and means for rotating said sleeve with respect to the cylinder in timed relation to the rotation of said crankshaft in such manner that on each complete revolution of the crankshaft the sleeve is rotated through an angle equal to 360° divided by the number of said intake ports.

2. The combination claimed in claim 1 in which said intake ports are arranged substantially tangentially to the inside wall of the cylinder.

3. The combination claimed in claim 2 in which said intake ports are flared outwardly from the outside wall of the cylinder to the inside wall thereof so that the area of the entrance to said ports is less than the area of the exits from the ports.

4. The combination claimed in claim 3 in which the leading surfaces of said ports are curved so that they are substantially tangential to the inside surface of the cylinder wall.

5. The combination claimed in claim 2 in which said piston begins to open said exhaust ports when said crankshaft has rotated approximately 135° from top dead center.

6. The combination claimed in claim 5 in which said exhaust ports are fully opened when said crankshaft has rotated approximately 180° from top dead center.

7. The combination claimed in claim 6 in which said piston closes said exhaust ports when said crankshaft has rotated approximately 225° from top dead center.

8. The combination claimed in claim 1 in which the rotation of said sleeve begins to open said intake ports when said crankshaft has rotated approximately 150° from top dead center.

9. The combination claimed in claim 1 in which the said intake ports in the cylinder and the said slots in said sleeve are in full conjunction when said crankshaft has rotated approximately 195° from top dead center.

10. The combination claimed in claim 1 in which the rotation of said sleeve closes said intake ports when said crankshaft has rotated approximately 240° from top dead center.

11. The combination claimed in claim 8 in which the rotation of said sleeve closes said intake ports when said crankshaft has rotated approximately 240° from top dead center.

* * * * *